United States Patent [19]

Verhoff et al.

[11] 4,403,267

[45] Sep. 6, 1983

[54] ELECTRICALLY HEATED VACUUM FURNACE WITH A FAULT DETECTION SYSTEM

[75] Inventors: Steven H. Verhoff; David A. Krieger, both of Toledo, Ohio

[73] Assignee: Midland-Ross Corporation, Cleveland, Ohio

[21] Appl. No.: 378,078

[22] Filed: May 14, 1982

[51] Int. Cl.³ ............................................. H02H 3/16
[52] U.S. Cl. ..................................... 361/42; 219/499; 307/231; 361/92; 361/182; 361/187
[58] Field of Search ............... 219/322, 363, 423, 425, 219/481, 485, 497, 499; 361/42, 88, 92, 182, 187; 340/650; 307/231, 510

[56] References Cited

U.S. PATENT DOCUMENTS

| 2,832,916 | 4/1958 | Kennedy | 361/42 X |
| 3,234,316 | 2/1966 | Mathews | 361/42 X |
| 3,959,692 | 5/1976 | Wetzel | 219/499 X |
| 3,992,636 | 11/1976 | Kiffmeyer | 307/231 |
| 4,159,501 | 6/1979 | White | 361/42 X |

FOREIGN PATENT DOCUMENTS 144680 6/1961 U.S.S.R. .............................. 361/187

*Primary Examiner*—Harry E. Moose, Jr.
*Attorney, Agent, or Firm*—Harlan E. Hummer

[57] ABSTRACT

An electrically heated vacuum furnace is described as having a fault detection system which has the ability to sense among other things, carbon arc buildup, a load touching a heating element, short circuits from broken heating elements, and short circuits in any heating element connection whether it be single phase, three phase delta or three phase wye connections. The system essentially comprises an electrically balanced wheatstone bridge which is in a main circuit in parallel with the electric heating element and the grounded casing of the furnace. A switching mechanism maintains the circuit in a normally open condition. A timer is provided to periodically disrupt the flow of electric current to the electric heating element in the furnace. The switching mechanism will be operated to close the circuit if the circuit is free of electric current. Should any of the aforementioned faults occur, the bridge will be thrown out of balance so that there will be a small leakage of current which is detected and utilized in the shutting down of the furnace in cases where the fault is severe and necessitates stopping the operation of the furnace.

15 Claims, 2 Drawing Figures

ELECTRICALLY HEATED VACUUM FURNACE WITH A FAULT DETECTION SYSTEM

BACKGROUND OF THE INVENTION

The invention relates broadly to fault detection systems, and more particularly to a system that is utilized in connection with an electrically heated vacuum furnace to detect faults such as carbon buildup, a load touching a heating element, short circuits from broken heating elements, and short circuits in any heating element connection, including single phase, three phase delta, and three phase wye connections. Applicants are not aware of any system other than theirs, for sensing all of the above-described faults which may occur during operation of a vacuum furnace using any of the aforementioned connections.

Briefly stated, the invention is in a device for detecting in an electrically heated furnace any of the aforementioned faults. The device essentially comprises, (I) an electrically balanced bridge having one of its resistant legs in electrical communication with the electric heating element and the grounded casing of the furnace, (II) means for periodically shutting off the flow of electric current to the heating elements, and (III) means for detecting leakage of electrical current from the bridge when any of the aforementioned faults causes an unbalancing of the bridge.

Means are provided for continuously monitoring the circuit, including the electrical heating element and casing, for the flow of alternating current to the bridge and for maintaining the circuit open to prevent destruction of the bridge when there is an alternating current in the circuit. Because of the weakness of the electrical current leaking from the bridge, means are provided for amplifying the leakage for detection and subsequent use in a visual readout device or, in more sophisticated systems, to shut down operation of the furnace by stopping the flow of alternating current to the electrical heating element.

DESCRIPTION OF THE DRAWING

The following description of the invention will be better understood by reference to the accompanying drawing, wherein.

DETAILED DESCRIPTION OF THE DRAWING

Figure 1:
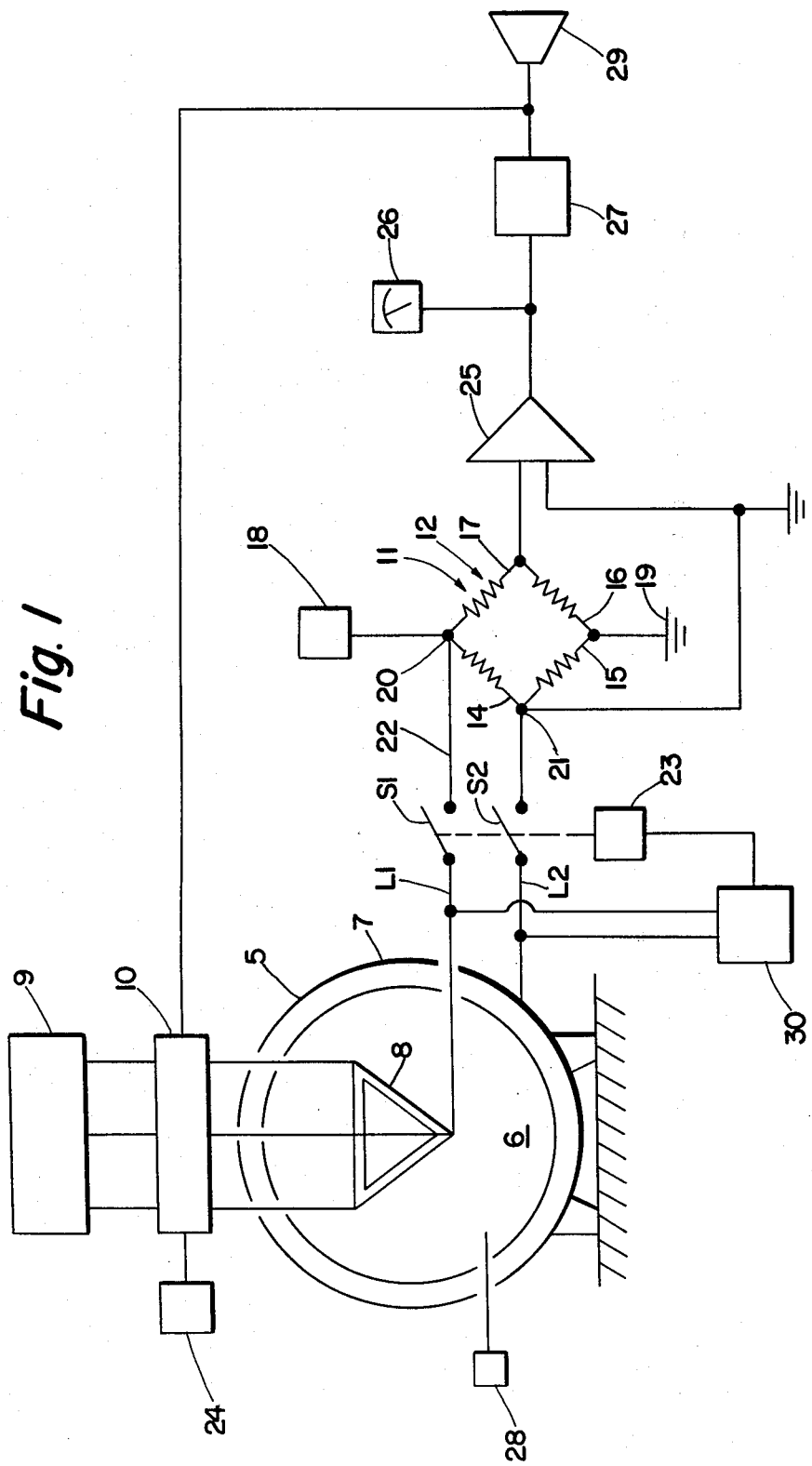
FIG. 1 is a schematic of a vacuum furnace and a fault detector which is made in accordance with the invention.

With particular reference to FIG. 1, there is shown a vacuum furnace 5 having a heat treatment chamber 6 which is sealable with the ambient atmosphere and defined within an outer shell or casing 7. One or a plurality of three phase delta connected graphite electrical heating elements 8 are disposed within the chamber 6 for heating workpieces that are placed within the chamber for heat treatment. The heating element 8, in some instances, may be of the single phase or three phase wye connections. Any suitable means 9 are provided for supplying three phase alternating current (AC) to the heating element 8. Any appropriate shutoff device 10 is disposed between the heating element 8 and source 9 of AC to stop the flow of AC to, and consequent operation of, the heating element 8.

A device, generally indicated at 11, is provided for detecting any of the aforementioned faults. The device or fault detector 11 comprises a wheatstone bridge 12 which has four resistant legs 14–17 that are in electrical communication with a source 18 of different current (DC) and ground 19. The source 18 of DC and the resistances of the legs 14–17 are chosen, so that the bridge 12 is in balance, i.e. there is no flow of DC from the bridge 12. The opposing ends 20,21 of one of the resistance legs 14 is in electrical communication with the heating element 8 and casing 7, via the legs L1,L2 of the main electrical circuit 22. A switching mechanism, including a pair of switches S1,S2 in the lines L1,L2, is provided to open and close the main circuit 22. The switches S1,S2 are maintained in a normally open position by any suitable relay 23 which is operated by an electrical current that accuates closing of the switches S1,S2. Any suitable timer 24 is provided to periodically operate the shutoff device 10 to consequently stop the flow of AC to the heating element 8.

It should be appreciated by those skilled in the art that should any of the aforementioned faults exist, the bridge 12 will become unbalanced because of the decreased resistance created by the fault, so that there will be a leakage of current from the bridge 12. The trickle of DC from the unbalanced bridge 12 is microscopic and hardly detectable. Therefore the leakage of DC is subsequently amplified by one or a plurality of amplifiers 25, so that it is at least observable on any suitable meter 26 for recording the flow of DC. An operator can determine from the readout on the meter 26 whether the fault is critical and requires immediate attention. If the fault is not critical, then it is monitored in hopes that the heat treatment can be successfully completed. If the fault is serious and occurs near the completion of the heat treatment then it may be wiser to put off taking any action until the heat treatment of the workpiece is complete, especially if there is no immediate danger to the workpiece or furnace, since it is costly and time consuming to shut down operation of the furnace.

In more sophisticated fault detector systems, the amplified leakage of DC from the unbalanced bridge 12 is transmitted to any suitable comparator 27 where the leakage is compared to a norm which indicates a dangerous condition. If the leakage equals the norm, then the comparator 27 is adapted to react to actuate the shutoff device 10, which stops operation of the furnace 5 by shutting off the flow of AC to the heating element 8, and, for example, a cooling device 28 which circulates cool air within the heat treatment chamber 6 to rapidly cool the furnace and any workpieces within the chamber, to prevent, for example, carbon from reacting with the workpieces to lower their melting points, whereby they become susceptible to being damaged.

In some cases, the comparator 27 may be designed to actuate an audible alarm 29 to make an operator or observer aware that a critical condition exists or is approaching. A special device 30 is provided for monitoring the circuit 22 for the flow of AC from the furnace 5 to the bridge 12, since such a current could prove destructive to the bridge 12. The monitoring device 30 is designed to operate the relay 23 which controls closing of the switches S1,S2, only if no AC exists in the circuit 22. If AC does exist in the circuit 22, then the monitoring device 30 reacts to prevent operation of the relay 23 and consequent closing of the switches S1,S2.

Figure 2:
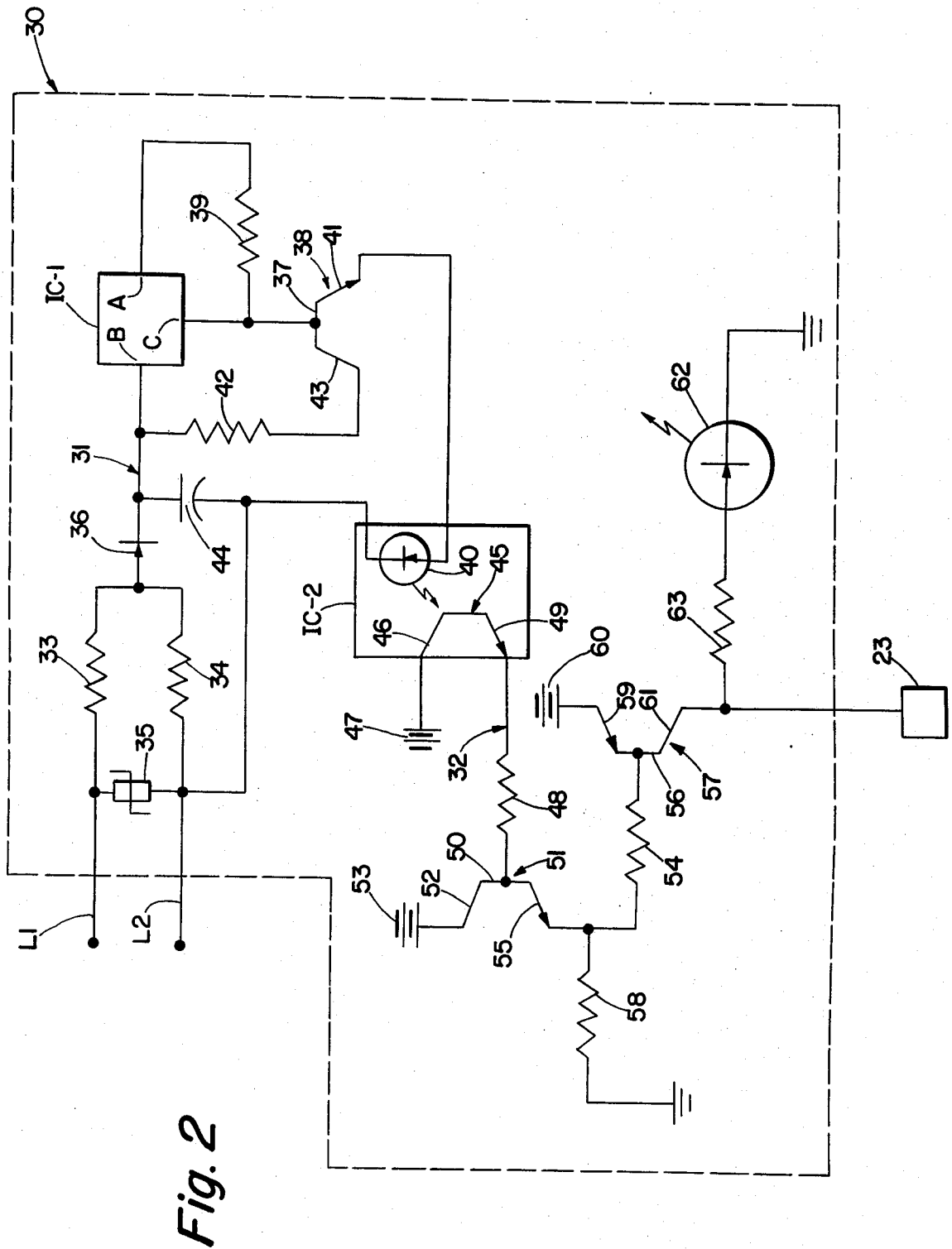
FIG. 2 is a wiring diagram of the means used in the fault detector for monitoring the flow of electric current to the balanced bridge of the system.

With particular reference to FIG. 2, the monitoring device 30 essentially comprises, (I) a primary circuit 31 which is in electrical communication with the legs L1,L2 of the main circuit 22 between the furnace 5 and switches S1, S2, and (II) a secondary circuit 32 which contains the relay 23 and is optically coupled to the primary circuit 31, as will be hereinafter explained.

The primary circuit 31 contains a pair of first and second parallel resistors 33,34 which are designed to lower the AC voltage input to not more than 30 volts maximum in the primary circuit 31. A varistor 35 is disposed in the primary circuit 31, in parallel, with the first and second resistors 33,34, and is a transient surge arrestor which is provided to protect the primary circuit 31 from inductive and capacitive line voltage spikes. The first and second resistors 33,34 are, in series, with, (I) a first diode which acts as half-wave rectifier for changing AC to DC, and (II) a first integrated circuit IC-1 having three regulator connectors ABC, the first diode 36 being coupled to the second regulator connector B.

The base 37 of the first NPN transistor 38 is wired to the third regulator connector C of the first integrated circuit IC-1. A third resistor 39 is connected, in parallel, with the first integrated circuit IC-1 between the base 37 of the first transistor 38 and the first regulator connector A of the first integrated circuit IC-1. A second light emitting diode 40 is, in series, with the emitter 41 of the first transistor 38. A fourth resistor 42 is connected, in parallel, with the first integrated circuit IC-1 between the second regulator connector B of the first integrated circuit IC-1 and the collector 43 of the first transistor 38. A capacitor 44 is mounted, in parallel, with the first diode 36 and acts as a filter with the diode 36 to remove ripple and give a DC voltage potential and current.

The first integrated circuit IC-1, resistors 39,42, and transistor 38 coact to regulate the DC at a fixed value at which the light emitting diode 40 operates.

The secondary circuit 32 comprises a second, photo-conductive NPN transistor 45 which is designed to receive light that emitts from the light emitting diode 40, and which is optically coupled to the light emitting diode 40 by means of a second integrated circuit IC-2. The collector 46 of the photoconductive transistor 45 is in electrical communication with a source 47 of DC potential. A fifth resistor 48 is, in series, with the emitter 49 of the second photoconductive transistor 45 and the base 50 of a third NPN transistor 51. The collector 52 of the third transistor 51 is also connected to a source 53 of DC potential. A sixth resistor 54 is, in series with the emitter 55 of the third transistor 51 and the base 56 of a fourth, PNP transistor 57. The particular arrangement of the last two NPN and PNP transistors 51,57 is important to the energization of the relay 23. A grounded, seventh resistor 58 is also, in series, with the emitter 55 of the third transistor 51. The emitter 49 of the fourth transistor 57 is connected to a source 60 of DC potential and the collector 61 of the fourth transistor 57 is in electrical communication with the relay 23 for operating the switches S1,S2. A grounded, light emitting diode 62 and eighth resistor 63 are wired, in series, with the collector 61 of the fourth transistor 57 and act to provide a visual signal when the monitoring device 30 is sending DC to the relay 23 for closing the switches S1,S2.

AC, when present in the heating element 8, flows through the legs L1,L2 of the main circuit 22 into the primary circuit 31 where it is converted into DC to operate the light emitting diode 40 which causes a subsequent response from the photoconductive transistor 45 in the secondary circuit 32. DC passes from the photoconductive transistor 45 through the downstream resistor 48 to the base 50 of the next succeeding NPN transistor 51. This causes the base 50 to be forward biased relative to the emitter 55 of the transistor 51 which conducts DC through the next downstream resistor 54 to the base 56 of the last PNP transistor 57. Because of the particular arrangement of these last two transistors 51,57 and the values of the last resistor 54 and grounded resistor 58, the conduction of DC to the base 56 of the last transistor 57 causes the base 56 to be reversed biased relative to the emitter 59 of the transistor 57, so that no DC is conducted through the transistor 57 to energize the relay 23 and close the switches S1,S2. Thus, the main circuit 22 remains open so that the AC from the heating element 8 will not flow into the circuitry of the wheatstone bridge 12 to damage it, or produce any false readings. It can be appreciated that, when there is no AC in the heating element 8, none of the aforementioned will happen. Because of the value of the last resistor 54, DC will flow from the source 60 of DC potential through the last transistor 57 to the relay 23 to energize the relay 23 to close the switches S1,S2 and main circuit 22, so that the furnace 5 can be monitored for carbon build-up or short circuiting.

The disadvantage of the above-described system is that the heating elements 8 must be shut down during the test for the aforementioned faults. However, such shutdowns are brief and vary, for example, from 2 to 30 seconds which does not adversely affect the heat treatment of the workpiece within the vacuum furnace.

Thus, there has been described a unique system for detecting any of the aforementioned faults before the workpiece or furnace is seriously injured as a result of the fault.

What is claimed is:

1. A device for detecting in a electrically heated furnace, a fault, such as a short caused by breakage of an electric heating element operable by AC, comprising:
    (a) a bridge, including four resistance legs which are in electrical communication with a source of DC which is balanced by the resistance of the legs, so that no DC flows from the bridge;
    (b) a main electrical circuit including one of the resistance legs in series with an electric heating element and casing of the furnace, the bridge becoming unbalanced when a fault occurs so that DC will leak therefrom; the circuit including a switching mechanism which maintains the circuit in a normally open condition;
    (c) means for detecting leakage of DC from the bridge;
    (d) means for periodically shuting off AC to the heating element; and
    (e) means for operating the switching mechanism to close the circuit when the circuit is free of AC.

2. The device of claim 1, wherein the means (e) for operating the switching mechanism includes:
    (f) a relay for actuating closure of the switching mechanism and for maintaining it in a normally open position;
    (g) means for monitoring the circuit between the furnace and switching mechanism for AC and operating the relay when the circuit is free of AC.

3. The device of claim 2, which includes:

(h) a source of AC for the electric heating element of the furnace; and (i) the means for periodically shuting off AC to the heating element, includes:

(I) a shutoff device for opening and closing another circuit including the source of AC and the heating element; and (II) a timer associated with the shutoff device for periodically causing the shutoff device to open the other circuit, including the source of AC and the electric heating element, for a predetermined period of time.

4. The device of claim 3, wherein the means for detecting leakage of DC from the bridge, includes:

(I) means for amplifying leakage of DC from the bridge; and (II) means for at least visually recording the leakage of DC from the bridge.

5. The device of claim 4, wherein the means for at least visually recording leakage of DC from the bridge, includes:

(I) means for comparing leakage of DC from the bridge to a norm which represents a dangerous condition; and (II) means for operating the shutoff device to stop the flow of AC to the heating element, when the leakage of DC from the bridge equals the norm.

6. The device of claim 5, which includes means for sounding an audible alarm when the leakage of DC from the bridge at least approaches the norm.

7. The device of claim 2 or 6, wherein the means for monitoring the main circuit from the furnace to the switching mechanism for AC includes:

(I) a primary circuit, including means in electrical communication with the main circuit for translating AC in the main circuit to a predetermined constant value of DC;

(II) a secondary circuit, including means optically responsive to DC in the primary circuit for preventing AC from entering the resistance legs of the bridge; and (III) optic means coating with the means of the primary and secondary circuits for electrically isolating the primary and secondary circuits from each other.

8. The device of claim 7, wherein the optic means and means included in the primary and secondary circuits, includes:

(a) a pair of first and second parallel resistors in the primary circuit to lower the AC voltage input to a predetermined level;

(b) a varistor in the primary circuit in parallel with the resistors to protect the circuit from inductive and capacitive line voltage spikes;

(c) a first diode in the primary circuit in series with the resistors to provide a half-wave rectifier of the AC to DC;

(d) a first integrated circuit which is part of the primary circuit and which is in series with the first diode and having three regulator connectors, the second of which is in electrical communication with the first diode;

(e) a first NPN transistor in the primary circuit and having a base which is connected to the third of the three regulator connectos of the first integrated circuit;

(f) a second, light emitting diode in the primary circuit in series with the emitter of the first transistor;

(g) a third resistor in the primary circuit and electrically connected between the base of the first transistor and third regulator connector of the first integrated circuit and the first of the three regulator connectors of the first integrated circuit;

(h) a fourth resistor in the primary circuit and connected between the first diode and second regulator connector of the first integrated circuit and the collector of the first transistor;

(i) a second, photoconductive NPN transistor in the secondary circuit and responsive to light emitting from the second diode, the collector of the second transistor connected to a source of DC;

(j) a fourth resistor in the secondary circuit in series between the emitter of the second transistor and the base of a third NPN transistor which has a collector that is in communication with a source of DC;

(k) a fifth resistor in the secondary circuit in series between the emitter of the third transistor and the base of a fourth PNP transistor and the base of a fourth PNP transistor which has an emitter that is in electrical communication with a source of DC;

(l) a sixth grounded resistor in the secondary circuit and connected to the emitter of the third resistor;

(m) a second integrated circuit optically coupling the second light emitting diode of the primary circuit and the second, light conductive transistor of the secondary circuit; and (n) means for connecting the relay to the collector of the fourth transistor.

9. The device of claim 8, wherein the secondary circuit of the monitoring means includes a seventh resistor and third, light emitting diode in series between the collector of the fourth transistor and ground.

10. A device for monitoring a normally open main circuit for AC, comprising:

(a) a primary circuit including means in electrical communication with the main circuit for translating AC in the main circuit to a predetermined constant value of DC;

(b) a secondary circuit, including means optically responsive to DC in the primary circuit for maintaining the main circuit open, if DC is in the secondary circuit, and for closing the main circuit, if there is no DC in the secondary circuit; and (c) optic means coacting between the means of the primary and secondary circuits for electrically isolating the primary and secondary circuits from each other.

11. The device of claim 10, wherein all of said means include:

(a) a pair of first and second parallel resistors in the primary circuit to lower the AC voltage input to a predetermined level;

(b) a varistor in the primary circuit in parallel with the resistors to protect the circuit from inductive and capacitive line voltage spikes;

(c) a first diode in the primary circuit in series with the resistors to provide a half-wave rectifier of the AC to DC;

(d) a first integrated circuit which is part of the primary circuit and which is in series with the first diode and having three regulator connectors, the second of which is in electrical communication with the first diode;

(e) a first NPN transistor in the primary circuit and having a base which is connected to the third of the three regulator connectors of the first integrated circuit;
(f) a second, light emitting diode in the primary circuit in series with the emitter of the first transistor;
(g) a third resistor in the primary circuit and electrically connected between the base of the first transistor and third regulator connector of the first integrated circuit and the first of the three regulator connectors of the first integrated circuit
(h) a fourth resistor in the primary circuit and connected between the first diode and second regulator connector of the first integrated circuit and the collector of the first transistor;
(i) a second, photoconductive NPN transistor in the secondary circuit and responsive to light emitting from the second diode, the collector of the second transistor connected to a source of DC;
(j) a fourth resistor in the secondary circuit in series between the emitter of the second transistor and the base of a third NPN transistor which has a collector that is in communication with a source of DC:
(k) a fifth resistor in the secondary circuit in series between the emitter of the third transistor and the base of a fourth PNP transistor which has an emitter that is in electrical communication with a source of DC;
(l) a sixth grounded resistor in the secondary circuitry and connected to the emitter of the third resistor;
(m) a second integrated circuit optically coupling the second light emitting diode of the primary circuit and the second, light conductive transistor of the secondary circuit; and
(n) means for connecting the relay to the collector of the fourth transistor.

12. The device of claim 11, wherein the secondary circuit includes a seventh resistor and third, light emitting diode in series between the collector of the fourth transistor and ground.

13. In combination:
(a) a furnace having an outer casing which is grounded and a heat treatment chamber within the casing;
(b) at least one heating element in the chamber and operable by AC from a source;
(c) means for periodically stopping the flow of AC from the source to the heating element;
(d) means for detecting an electrical fault, such as a shorting of the heating element, within the chamber, including:
  (I) a DC circuit including a balanced bridge having four resistance legs, the bridge being damageable by AC;
  (II) a main circuit including one of the resistance legs of the bridge and the heating element and grounded casing;
  (III) means for detecting the leakage of DC from the bridge circuit;
  (IV) means for maintaining the main circuit normally open;
  (V) means for monitoring the main circuit for AC and maintaining the main circuit open if AC is detected therein and for closing the main circuit if AC is not detected therein, including:
    (i) a primary circuit including means for translating AC in the main circuit to a predetermined value of DC;
    (ii) a secondary circuit including means optically responsive to DC in the primary circuit for maintaining the main circuit open if DC is in the primary circuit and for closing the main circuit if DC is not in the primary circuit; and
    (iii) optic means coacting between the means of the primary and secondary circuits for electrically isolating the primary and secondary circuits from each other.

14. The combination of claim 13 including:
(a) a pair of first and second parallel resistors in the primary circuit to lower the AC voltage input to a predetermined level;
(b) a varistor in the primary circuit in parallel with the resistors to protect the circuit from inductive and capacitive line voltage spikes;
(c) a first diode in the primary circuit in series with the resistors to provide a half-wave rectifier of the AC to DC;
(d) a first integrated circuit which is part of the primary circuit and which is in series with the first diode and having three regulator connectors, the second of which is in electrical communication with the first diode;
(e) a first NPN transistor in the primary circuit and having a base which is connected to the third of the three regulator connectors of the first integrated circuit;
(f) a second, light emitting diode in the primary circuit in series with the emitter of the first transistor;
(g) a third resistor in the primary circuit and electrically connected betwen the base of the first transistor and third regulator connector of the first integrated circuit and the first of the three regulator connectors of the first integrated circuit;
(h) a fourth resistor in the primary circuit and connected between the first diode and second regulator connector of the first integrated circuit and the collector of the first transistor;
(i) a second, photoconductive NPN transistor in the secondary circuit and responsive to light emitting from the second diode, the collector of the second transistor connected to a source of DC;
(j) a fourth resistor in the secondary circuit in series between the emitter of the second transistor and the base of a third NPN transistor which has a collector that is in communication with a source of DC;
(k) a fifth resistor in the secondary circuit in series between the emitter of the third transistor and the base of a fourth PNP transistor and the base of a fourth PNP transistor which has an emitter that is in electrical communication with a source of DC;
(l) a sixth grounded resistor in the secondary circuit and connected to the emitter of the third resistor;
(m) a second integrated circuit optically coupling the second light emitting diode of the primary circuit and the second, light conductive transistor of the secondary circuit; and
(n) means for connecting the relay to the collector of the fourth transistor.

15. The combination of claim 14, wherein the secondary circuit of the monitoring means includes a seventh resistor and third, light emitting diode in series between the collector of the fourth transistor and ground.

* * * * *